United States Patent
Douglas et al.

(10) Patent No.: US 10,112,334 B2
(45) Date of Patent: Oct. 30, 2018

(54) SYSTEM AND METHOD FOR CONTINUOUSLY MANUFACTURING CURED MEMBRANES

(71) Applicant: FIRESTONE BUILDING PRODUCTS CO, LLC, Indianapolis, IN (US)

(72) Inventors: Bruce Douglas, Zionsville, IN (US); Michael Hubbard, Anderson, IN (US); Hao Wang, Carmel, IN (US)

(73) Assignee: Firestone Building Products Co., LLC, Indianapolis, IN (US)

( * ) Notice: Subject to any disclaimer, the term of this patent is extended or adjusted under 35 U.S.C. 154(b) by 797 days.

(21) Appl. No.: 14/385,864

(22) PCT Filed: Mar. 20, 2013

(86) PCT No.: PCT/US2013/033081
§ 371 (c)(1),
(2) Date: Sep. 17, 2014

(87) PCT Pub. No.: WO2013/142562
PCT Pub. Date: Sep. 26, 2013

(65) Prior Publication Data
US 2015/0076743 A1    Mar. 19, 2015

Related U.S. Application Data

(60) Provisional application No. 61/613,088, filed on Mar. 20, 2012.

(51) Int. Cl.
| | |
|---|---|
| *H01J 37/30* | (2006.01) |
| *B29C 47/00* | (2006.01) |
| *C08J 5/18* | (2006.01) |
| *B29C 43/22* | (2006.01) |
| *B29C 35/10* | (2006.01) |
| *E04D 5/06* | (2006.01) |
| *B29C 47/36* | (2006.01) |

(Continued)

(52) U.S. Cl.
CPC .......... *B29C 47/0021* (2013.01); *B29C 35/10* (2013.01); *B29C 43/22* (2013.01);
(Continued)

(58) Field of Classification Search
CPC ....... B29C 43/22; B29C 47/0021; B29D 7/01; C08J 5/18
See application file for complete search history.

(56) References Cited

U.S. PATENT DOCUMENTS

| | | |
|---|---|---|
| 2,619,481 A | 11/1952 | Baldwin et al. |
| 3,280,082 A | 10/1966 | Natta et al. |

(Continued)

FOREIGN PATENT DOCUMENTS

| | | |
|---|---|---|
| EP | 0 285 929 A2 | 10/1988 |
| EP | 0 484 872 A2 | 5/1992 |

(Continued)

OTHER PUBLICATIONS

International Search Report of PCT/US2013/033081.
(Continued)

*Primary Examiner* — Stella K Yi
(74) *Attorney, Agent, or Firm* — Brian D. McAlhaney; Arthur M. Reginelli

(57) ABSTRACT

A method of continuously manufacturing a cured membrane includes continuously compounding and mixing a vulcanizable rubber composition in a mixing extruder while continuously removing gasses from the vulcanizable rubber composition during mixing with a vacuum. The vulcanizable rubber composition may be continuously extruded to form an extrudate, which may be continuously calendered to form a green membrane. The green membrane may be continuously cured, such as by a hot air conveyor curing system, to form a cured membrane.

17 Claims, 4 Drawing Sheets

(51) Int. Cl.
  *B29C 47/60* (2006.01)
  *B29D 7/01* (2006.01)
  *B29K 21/00* (2006.01)
  *B29C 35/04* (2006.01)
  *B29C 35/08* (2006.01)
  *B29K 19/00* (2006.01)
  *B29L 7/00* (2006.01)

(52) U.S. Cl.
  CPC .......... *B29C 47/366* (2013.01); *B29C 47/369* (2013.01); *B29C 47/6006* (2013.01); *B29C 47/6025* (2013.01); *B29D 7/01* (2013.01); *C08J 5/18* (2013.01); *E04D 5/06* (2013.01); *B29C 35/045* (2013.01); *B29C 2035/0822* (2013.01); *B29C 2035/0827* (2013.01); *B29C 2035/0877* (2013.01); *B29K 2019/00* (2013.01); *B29K 2021/00* (2013.01); *B29L 2007/008* (2013.01); *C08J 2323/16* (2013.01)

(56) References Cited

U.S. PATENT DOCUMENTS

| | | |
|---|---|---|
| 4,372,736 A | 2/1983 | Gooch et al. |
| 4,538,917 A * | 9/1985 | Harms .................. B29C 47/38 366/324 |
| 5,854,327 A | 12/1998 | Davis et al. |
| 6,093,354 A | 7/2000 | Hubbard et al. |
| 6,506,447 B1 | 1/2003 | Hirsch et al. |
| 6,632,509 B1 | 10/2003 | Davis et al. |
| 6,780,271 B1 | 8/2004 | Burmeister et al. |
| 7,284,897 B2 | 10/2007 | Blach |
| 8,367,760 B1 * | 2/2013 | Wang ..................... B32B 5/028 524/492 |
| 8,791,193 B2 | 7/2014 | Wang et al. |
| 2005/0170086 A1 | 8/2005 | Tynan, Jr. et al. |
| 2006/0280892 A1 | 12/2006 | Davis et al. |
| 2007/0194482 A1 | 8/2007 | Douglas et al. |

FOREIGN PATENT DOCUMENTS

| | | |
|---|---|---|
| GB | 874 805 A | 8/1961 |
| WO | 2004/009327 A1 | 1/2004 |

OTHER PUBLICATIONS

Battenfeld Extrustionstechnik GmbH. "Planetary Roller Extruder" p. 1-8 (Oct. 2007).

American Maplan Corporation. "Planterary Roller Extruder" p. 1-13 (Sep. 2004).

* cited by examiner

SYSTEM AND METHOD FOR CONTINUOUSLY MANUFACTURING CURED MEMBRANES

This application is a national-stage application of International Application Serial No. PCT/US2013/033081, filed on Mar. 20, 2013, which claims the benefit of U.S. Provisional Application Ser. No. 61/613,088, filed Mar. 20, 2012, which are incorporated herein by reference.

FIELD OF THE INVENTION

One or more embodiments of the present invention relate to a system and method for continuously manufacturing cured membranes. In certain embodiments the system and method may include the continuous mixing of a vulcanizable rubber in a mixing extruder and the continuous curing of the rubber.

BACKGROUND OF THE INVENTION

Roofing systems often include water impermeable sheets of polymeric materials installed over a roof deck. The polymeric sheets, or membranes, may be formed from a variety of known polymeric materials. These membranes can be thermoformable or thermoset. For example, thermoset membranes may be prepared from ethylene-propylene-diene rubber (EPDM).

Roofing membranes are typically installed in an overlapping arrangement, with lap seams formed between adjacent membranes to maintain the integrity of the roofing system and prevent water infiltration. A variety of mechanisms and techniques are known in the art for securing these membranes to the roof surface. The same or similar membranes are also useful in other environments, such as, for example, geomembranes used in pond lining and other landscaping applications.

Known techniques and methods for forming cured membranes, including EPDM membranes, have proven to be largely successful. Advancements in manufacturing processes in recent years have led to improved product quality and manufacturing efficiencies, which has led to an overall growth in the popularity of cured roofing membranes. However, further improvements of the methods and techniques for producing EPDM sheets are desired. One significant deficiency of prior art methods for manufacturing the EPDM sheets are the batch processes employed. The vulcanizable rubber composition is often mixed in one or more batch processes that are both time consuming and labor intensive. In addition, curing of the EPDM sheets is often performed in batch processes by curing rolls of the EPDM sheet in curing ovens. These batch processes can slow production and increase costs.

Thus, there is a need for an improved system and method for manufacturing cured membranes that alleviates one or more of the deficiencies of the prior art and generally improves the art.

SUMMARY OF THE INVENTION

One or more embodiments of the present invention provide a method of continuously manufacturing a cured membrane, the method comprising: charging rubber, filler, oil, and a curative to a mixing extruder; mixing the rubber, filler, oil and curative to form a vulcanizable rubber composition; subjecting the vulcanizable rubber composition to a reduced pressure within the mixing extruder; extruding the vulcanizable rubber composition to form a continuous extrudate; applying a compressive force to the extrudate to form a green membrane; and applying energy to the green membrane to form a cured membrane.

One or more embodiments of the present invention also provides a method of manufacturing a cured membrane comprising: charging rubber, filler, oil, and a curative to a mixing extruder; mixing the rubber, filler, oil and curative to form a vulcanizable rubber composition; subjecting the vulcanizable rubber composition to a reduced pressure within the mixing extruder; extruding the vulcanizable rubber composition to form a continuous extrudate; applying a compressive force to the extrudate to form a green membrane; and applying energy to the green membrane to form a cured membrane, where the total processing time of the method after charging, including the steps of mixing, subjecting the composition to a reduced pressure, extruding, applying a compressive force, and applying energy to the green membrane is less than 2.0 hours.

One or more embodiments of the present invention also provides a system for continuously manufacturing cured membranes comprising: a planetary mixing extruder including a vacuum adapted to subject a vulcanizable rubber composition therein to a reduced pressure in a portion of the mixing extruder; a roller head die for extruding and calendering the vulcanizable rubber composition to form a green membrane; and a hot air conveyor for continuously curing the green membrane to produce a cured membrane.

DETAILED DESCRIPTION OF THE ILLUSTRATIVE EMBODIMENTS

Figure 1:
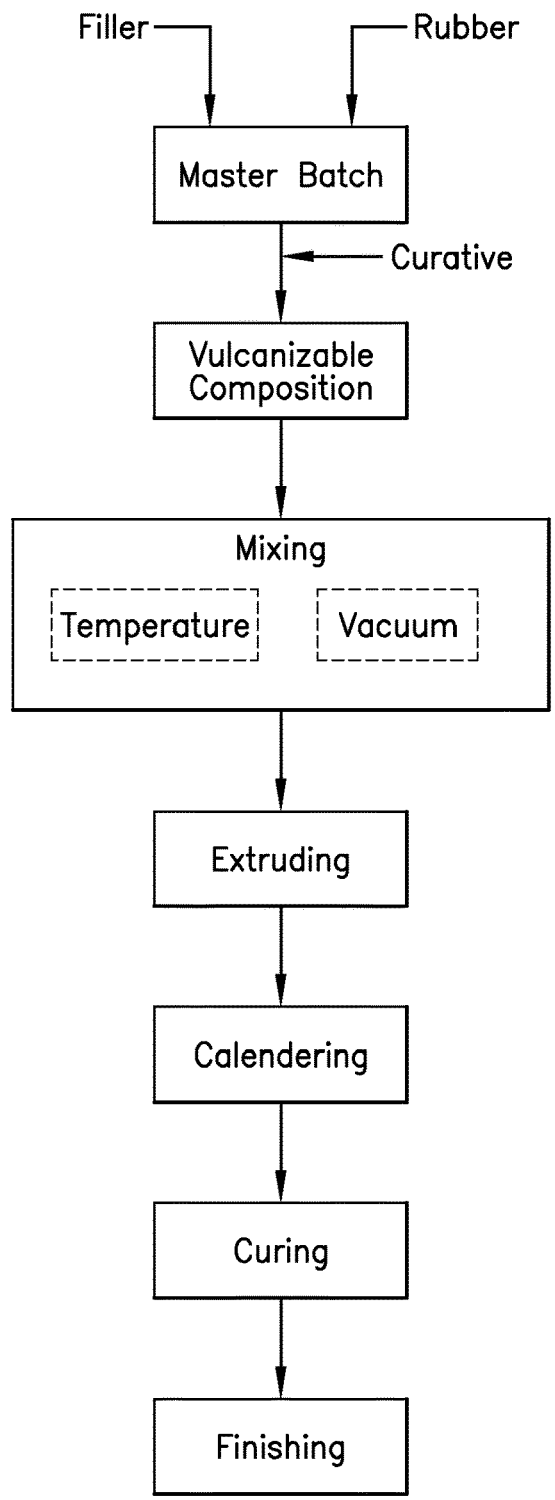
FIG. 1 is a flow chart showing the steps of the continuous process for manufacturing a cured rubber membrane according to the concepts of the present invention.

Embodiments of the present invention are based, at least in part, on the discovery of a continuous method of manufacturing thermoset membranes. In one or more embodiments, the methods include continuously compounding rubber into a vulcanizable composition, continuously extruding the vulcanizable composition into an extrudate, continuously calendering the extrudate into a sheet, and continuously curing the sheet into a thermoset membrane. While the prior art contemplates the continuous curing of calendered sheet, it has now been unexpectedly discovered that one or more aspects of continuous compounding, extruding and/or calendering in conjunction with a continuous curing step achieves technological advantages. For example, one or more of continuous compounding, extruding and/or calendering can provide a calendered sheet with low levels of entrapped gases, which facilitates curing of the sheet. Also, and by way of example, one or more of continuous compounding, extruding and/or calendering can provide a calendered sheet that is at least partially cured, which can facilitate subsequent curing steps.

In certain embodiments, the system may include a vacuum that communicates with the internal chamber of the mixing extruder to apply a suction force to remove gasses during mixing. In one or more embodiments, the calendered green membrane is substantially devoid of entrapped air that creates voids in the sheet, which may allow for continuous curing of the membrane without the application of pressure. Prior art methods contemplate either continuous mixing or continuous curing of membranes, but do not appreciate the criticality of employing continuous mixing and calendering steps that minimize voids within the curable composition, which leads to imperfections in membranes produced by prior art methods.

Vulcanizable Rubber Composition

In one or more embodiments, the membranes produced by the present invention include cured rubber, one or more fillers, and an extender. Additionally, these membranes, which may be black or non-black, may include other constituents that are employed in rubber membranes or rubber compounds. For example, the membranes may include oil, wax, antioxidant, antiozonant, flame retardant, and the like. The cured membranes are a cured network deriving from a vulcanizable rubber composition. The various other ingredients may be dispersed throughout the cured network. The membrane may further comprise fabric reinforcement.

In one or more embodiments, the cured rubber derives from a crosslinkable rubber. In one or more embodiments, the cured rubber derives from an olefinic rubber such as an olefinic terpolymer. In one or more embodiments, the olefinic terpolymer includes mer units that derive from ethylene, α-olefin, and optionally diene monomer. Useful α-olefins include propylene. In one or more embodiments, the diene monomer may include dicyclopentadiene, alkyldicyclopentadiene, 1,4-pentadiene, 1,4-hexadiene, 1,5-hexadiene, 1,4-heptadiene, 2-methyl-1,5-hexadiene, cyclooctadiene, 1,4-octadiene, 1,7-octadiene, 5-ethylidene-2-norbornene, 5-n-propylidene-2-norbornene, 5-(2-methyl-2-butenyl)-2-norbornene, and mixtures thereof. Olefinic terpolymers and methods for their manufacture are known as disclosed at U.S. Pat. No. 3,280,082 as well as U.S. Publ. Appl. No. 2006/0280892, both of which are incorporated herein by reference. Furthermore, olefinic terpolymers and methods for their manufacture as related to non-black membranes are known as disclosed in co-pending U.S. application Ser. Nos. 12/389,145, 12/982,198, and 13/287,417, which are also incorporated herein by reference. For purposes of this specification, elastomeric terpolymers may simply be referred to as EPDM.

In one or more embodiments, the elastomeric terpolymer may include at least 62 weight percent, and in other embodiments at least 64 weight percent mer units deriving from ethylene; in these or other embodiments, the elastomeric terpolymer may include at most 70 weight percent, and in other embodiments at most 69 weight percent, mer units deriving from ethylene. In one or more embodiments, the elastomeric terpolymer may include at least 2 weight percent, in other embodiments at least 2.4 weight percent, mer units deriving from diene monomer; in these or other embodiments, the elastomeric terpolymer may include at most 4 weight percent, and in other embodiments at most 3.2 weight percent, mer units deriving from diene monomer. In one or more embodiments, the balance of the mer units derive from propylene or other α-olefins. In one or more embodiments, low Mooney EPDM terpolymers are blended with high Mooney EPDM terpolymers to reduce the overall viscosity of the membrane compound and thereby accommodate processing.

As is known in the art, the rubber may be cured with a curative or cure system. The rubber can be cured by using numerous techniques such as those that employ sulfur cure systems, peroxide cure systems, and quinine-type cure systems. In certain embodiments, the sulfur cure systems may be employed in combination with vulcanizing accelerators. Suitable vulcanizing accelerators are disclosed in U.S. App. Publ. No. 2006/0280892, which is incorporated herein by reference.

Examples of suitable peroxides that can be used as curing agents or co-curing agents include alpha-cumyl hydroperoxide, methylethylketone peroxide, hydrogen peroxide, acetylacetone peroxide, t-butyl hydroperoxide, t-butyl peroxybenzoate, 2,5-bis(t-butyl peroxy)-2,5-dimethylhexene, lauryl peroxide, benzoyl peroxide, 2,4-dichlorobenzoyl peroxide, dibenzoyl peroxide, bis(p-monomethylene-benzoyl) peroxide, bis(p-nitrobenzoyl) peroxide, phenylacetyl peroxide, and mixtures thereof. In one or more embodiments, the peroxide curatives are employed in conjunction with a coagent. Examples of coagents include triallylcyanurate, triallyl isocyanurate, triallyl phosphate, sulfur, N-phenyl bis-maleamide, zinc diacrylate, zinc dimethacrylate, divinyl benzene, 1,2 polybutadiene, trimethylol propane trimethacrylate, tetramethylene glycol diacrylate, trifunctional acrylic ester, dipentaerythritolpentacrylate, polyfunctional acrylate, retarded cyclohexane dimethanol diacrylate ester, polyfunctional methacrylates, acrylate and methacrylate metal salts, oximer for e.g., quinone dioxime.

Examples of inorganic peroxides which can be used as co-curing agents with p-quinone dioxime include lead peroxide, zinc peroxide, barium peroxide, copper peroxide, potassium peroxide, silver peroxide, sodium peroxide, calcium peroxide, metallic peroxyborates, peroxychromates, peroxydicarbonates, peroxydiphosphates, peroxydisulfates, peroxygermanates, peroxymolybdates, peroxynitrates, magnesium peroxide, sodium pyrophosphate peroxide, and mixtures thereof.

Examples of polysulfide activators for the quinone-type co-curing agents include calcium polysulfide, sodium polysulfide, as well as organic polysulfides having the general formula R—$(S)_x$—R, wherein R is a hydrocarbon group and x is a number from 2-4. Examples of organic polysulfides are disclosed in U.S. Pat. No. 2,619,481, which is incorporated herein by reference.

Conventional radiation equipment and techniques can also be employed in the practice of this invention. Suitable ionizing crosslinking promoters that can be used include: liquid high-vinyl 1,2-polybutadiene resins containing 90 percent 1,2-vinyl content; Sartomer SR-206 (ethylene glycol dimethacrylate), Di-Cup R(dicumyl peroxide, about 98 percent active), and Pental A (pentaerythritol resin prepared from tall oil). These chemical additives are preferably compatible with the other ingredients in the composition, they may also function to reduce the dosage of ionizing radiation needed to obtain the desired level of crosslinking.

Sulfur and sulfur-containing cure systems may be used, and may also be used with an accelerator. Suitable amounts of sulfur can be readily determined by those skilled in the art. In one or more embodiments from about 0.25 to 3.0 parts by weight (pbw) sulfur per 100 parts by weight rubber (phr) may be used, in other embodiments from about 0.30 to 2.8 pbw sulfer phr, and in other embodiments from about 0.35 to 2.5 pbw sulfer phr. The amount of accelerator can also be readily determined by those skilled in the art. In one or more embodiments, from about 1.5 to about 10 pbw accelerator phr may be used, in other embodiments from about 2.0 to about 9 pbw accelerator phr may be used, in other embodiments from about 2.5 to about 8 pbw accelerator phr may be used, and in yet other embodiments from about 3.0 to about 7 pbw accelerator phr may be used.

As mentioned above, the membranes of the present invention include filler. These fillers may include those conventionally employed in the art, as well as combinations of two or more of these fillers. In one or more embodiments, the filler may include carbon black. Examples of useful carbon blacks include those generally characterized by average industry-wide target values established in ASTM D-1765. Exemplary carbon blacks include GPF (General-Purpose Furnace), FEF (Fast Extrusion Furnace), and SRF (Semi-Reinforcing Furnace). One particular example of a carbon black is N650 GPF Black, which is a petroleum-derived reinforcing carbon black having an average particle size of about 60 nm and a specific gravity of about 1.8 g/cc. Another example is N330, which is a high abrasion furnace black having an average particle size about 30 nm, a maximum ash content of about 0.75%, and a specific gravity of about 1.8 g/cc.

Other useful fillers include clay and talc, such as those disclosed in U.S. Publ. Appl. No. 2006/0280892, which is incorporated herein by reference. Still other useful fillers include silica, which may be used in conjunction with a coupling agent. Co-pending U.S. patent application Ser. No. 12/389,145 discloses useful fillers including silica, and is incorporated herein by reference.

As mentioned above, the membranes of the present invention may include extenders. Useful extenders include paraffinic, naphthenic oils, and mixtures thereof. These oils may be halogenated as disclosed in U.S. Pat. No. 6,632,509, which is incorporated herein by reference. In one or more embodiments, useful oils are generally characterized by low surface content, low aromaticity, low volatility and a flash point of more than about 550° F. Useful extenders are commercially available. One particular extender is a paraffinic oil available under the tradename SUNPAR™ 2280 (Sun Oil Company). Another useful paraffinic process oil is HYPRENE P150BS (Ergon Oil Inc. of Jackson, Miss.).

In addition to the foregoing constituents, the membranes of this invention may also optionally include mica, coal filler, ground rubber, titanium dioxide, calcium carbonate, silica, homogenizing agents, phenolic resins, flame retardants, zinc oxide, stearic acid, and mixtures thereof as disclosed in U.S. Publ. Appl. No. 2006/0280892. Certain embodiments may be substantially devoid of any of these constituents.

In one or more embodiments, the rubber membranes produced by the process of this invention may include from about 20 to about 50, in other embodiments from about 24 to about 36, and in other embodiments from about 28 to about 32% by weight Rubber (e.g., EPDM) based on the entire weight of the mixture.

In one or more embodiments, the rubber membranes produced by the process of this invention may include from about 5 to about 60, in other embodiments from about 10 to about 40, and in other embodiments from about 20 to about 25 pbw graphite phr (e.g., EPDM).

In one or more embodiments, the rubber membranes produced by the process of this invention may include from about 70 to about 100 pbw, in other embodiments from about 75 to about 95 pbw, and in other embodiments from about 77 to about 85 parts by weight carbon black phr. Certain embodiments may be substantially devoid of carbon black.

In one or more embodiments, the rubber membranes produced by the process of this invention may include from about 55 to about 95 pbw, in other embodiments from about 60 to about 85 pbw, and in other embodiments from about 65 to about 80 pbw extender per 100 pbw phr.

In one or more embodiments, the rubber membranes produced by the process of this invention may include from about 2 to about 10 pbw homogenizing agent phr. In other embodiments, the membrane includes at most 5 pbw homogenizing agent phr, and in other embodiments at most 3 pbw homogenizing agent phr. In certain embodiments, the membrane is devoid of homogenizing agent.

In one or more embodiments, the rubber membranes produced by the process of this invention may include from about 2 to about 10 pbw phenolic resin phr. In other embodiments, the membrane includes less than 4 pbw phenolic resin phr, and in other embodiments less than 2.5 pbw phenolic resin phr. In certain embodiments, the membrane is devoid of phenolic resin.

Continuous Mixing of the Vulcanizable Rubber Composition

A first step in the process of the present invention includes mixing rubber with the filler, curative, extender and other optional ingredients to thereby form a vulcanizable composition of matter. This step of mixing may also be referred to as compounding. The goal of compounding is to distribute the filler, curative, and other ingredients into the rubber, which is the continuous phase of the vulcanizable composition, so that the ingredients (e.g. fillers such as carbon black) are well dispersed. As those skilled in the art appreciate, the degree to which the filler, curative, and other ingredients are dispersed in rubber phase can impact the ultimate properties of the cured membrane. In one or more embodiments, the ability to disperse the filler, curative and other ingredients into the rubber is a function of temperature, mixing forces, and residence time within the mixing extruder.

Figure 2:
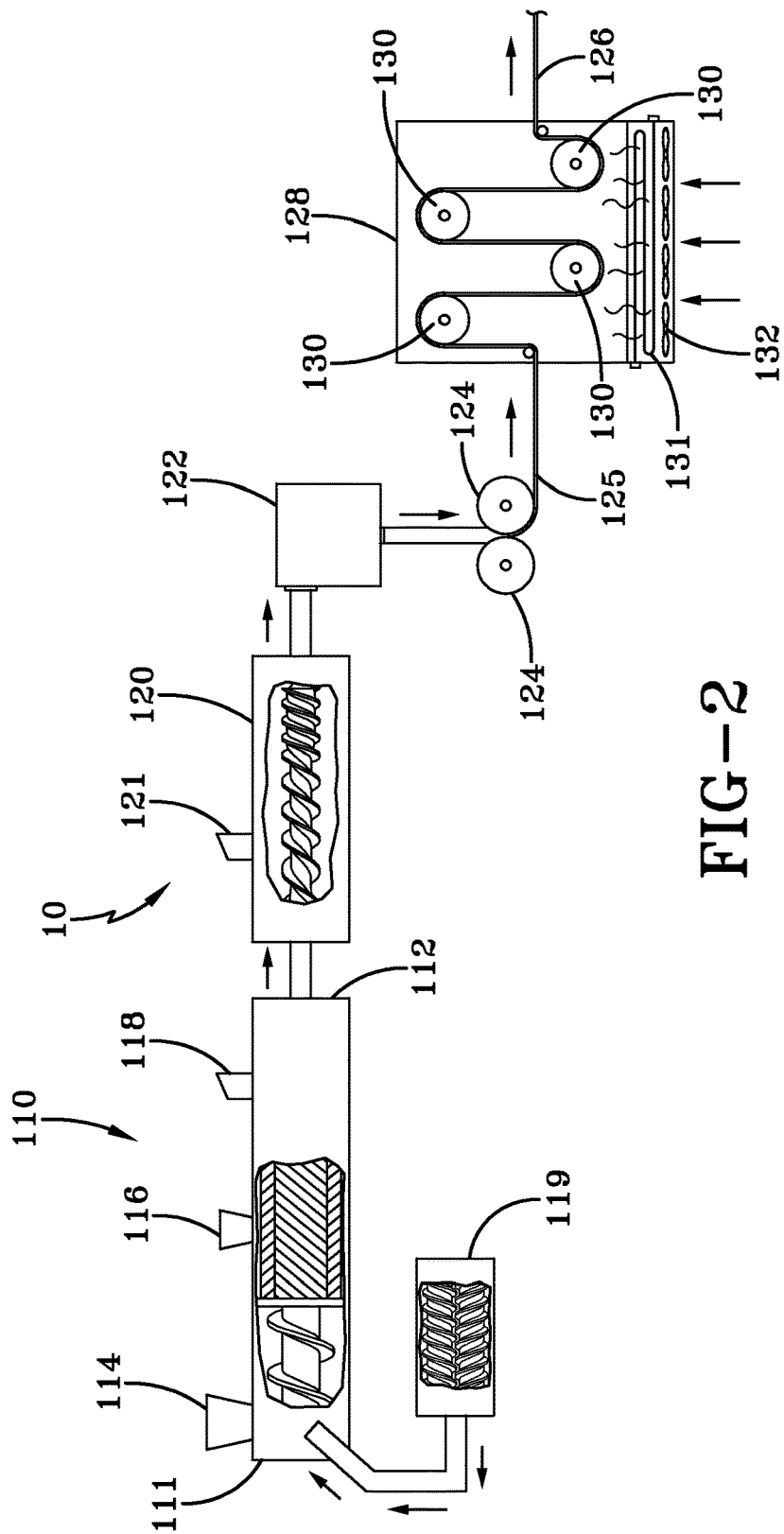
FIG. 2 is a schematic view of a system for continuously manufacturing cured membranes according to the concepts of the present invention.

In one or more embodiments, at least a portion of the continuous mixing of the rubber and other ingredients may be performed by one or more single and/or multi-screw mixing extruders 110 (see FIG. 2). While a single mixing extruder 110 will be described, it will be appreciated by those skilled in the art that a plurality of mixing extruders may be arranged to perform the same mixing functions as the single mixing extruder 110. The term mixing is used in its industrial sense where it refers to the act of applying mechanical energy to the composition to thereby manipulate the composition, which may, for example, serve to disperse the ingredients within the rubber.

In certain embodiments, the mixing extruder 110 may be a single-screw or twin-screw mixing extruder, as are well known in the art. In one or more embodiments, the mixing extruder 110 may be a Farrell continuous mixer. In a particular embodiment, and as shown in FIG. 2, the mixing extruder 110 may be a planetary mixing extruder. In certain embodiments, the mixing extruder may include at least two intermeshing screws that can subject the ingredients to shear while conveying the ingredients through the extruder from an inlet end 111 toward an outlet end 112.

The process of continuously forming a cured rubber sheet may optionally include subjecting the vulcanizable rubber composition to a reduced pressure within the mixing extruder 110. In one or more embodiments, a vacuum 118 may be provided to communicate with an internal mixing chamber of the mixing extruder 110. The vacuum 118 may apply a reduced pressure to a portion of the internal mixing chamber to draw gasses, such as air, from within the mixing extruder 110. Stated differently, the vacuum 118 may create an area of low pressure outside of the mixing extruder 110 that draws gasses from the internal mixing chamber and exhausts them to the atmosphere surrounding the mixing extruder 110.

The vacuum 118 acts to withdraw gasses that might otherwise become entrapped within the vulcanizable rubber composition to form voids. While a single vacuum 118 that applies a reduced pressure is shown and described, it is contemplated that multiple vacuums may be provided to apply reduced pressure to a different region or zone of the mixing extruder 110. In certain embodiments, the vacuum 118 may remove substantially all of the air and gas from the vulcanizable rubber composition during mixing, resulting in a vulcanizable rubber composition extrudate that is substantially devoid of voids created by air or gas. In one or more embodiments, the vulcanizable rubber composition, after introduction of the curative, may be subjected to low pressure to draw gasses therefrom.

In one or more embodiments, the vulcanizable rubber composition may be subjected to a reduced pressure of less than 80 kPa in a portion of the mixing extruder, in other embodiments less than 10 kPa, in still other embodiments less than 1.0 kPa, and in yet other embodiments less than 0.1 kPa.

In one or more embodiments, flow of the vulcanizable rubber composition within the mixing extruder 110 may be inhibited in a particular zone immediately upstream of the vacuum 118 by a flow inhibiting device. In certain embodiments, the flow inhibiting device may be one or more back-cut spindles or screws of the mixing extruder 110, or one or more back-cut portions of spindles or screws, that reduce the flow rate in a particular portion of the mixing extruder 110. In one or more embodiments, the flow inhibiting device may include a blocking protrusion or wall positioned within the mixing extruder 110 that blocks or restricts flow of the vulcanizable rubber composition within a portion of the mixing extruder.

The flow inhibiting device, and the resulting reduction or prevention of the flow of vulcanizable rubber composition through a particular portion of the mixing extruder 110, reduces the risk that the vacuum 118 will draw the vulcanizable rubber composition into the port or channel that communicates between the vacuum 118 and the mixing extruder 110. U.S. Pat. No. 7,284,897 discloses one or more suitable flow inhibiting devices for use in a mixing extruder and is incorporated herein by reference.

In one or more embodiments, charging of the mixing extruder 110 may include introducing the rubber (e.g. EPDM) and the filler, extender, and other constituents of the vulcanizable rubber composition at a feed throat 114. In other embodiments, charging of the mixing extruder 110 may include introducing one or more of the filler, extender, and/or other constituents at the one or more downstream secondary feed throats or ports 116. In certain embodiments, the step of charging the mixing extruder 110 may include introducing the filler, extender, and one or more other constituents of the vulcanizable rubber composition as a pre-blend mixture. In a particular embodiment, the step of charging the mixing extruder 110 includes introducing the curative to the mixing extruder 110 at a secondary feed throat 116 positioned downstream of the feed throat 114. In the same or other embodiments, the step of charging may include introducing a processing oil to the mixing extruder 110 at a secondary feed throat 116 positioned downstream of the feed throat 114.

In one or more embodiments, the rubber (e.g. EPDM) may be introduced into the mixing extruder 110 at the inlet end 111, such as through feed throat 114, as a particulate mass. For example, the vulcanizable rubber may be introduced into the mixing extruder 110 in pellet or chopped form. In other embodiments, the rubber may be introduced into the mixing extruder 110 at inlet end 111 in melt form.

In one or more embodiments, the step of charging may include introducing the rubber to the mixing extruder in melt form after it has been pre-mixed and/or heated in a pre-mixing extruder 119. In certain embodiments, the pre-mixing extruder used to convert the vulcanizable rubber to a melt form may be a single screw extruder, or a twin screw extruder as shown in FIG. 1. In certain embodiments, the pre-mixing extruder may be a side-feed extruder that communicates with the mixing extruder 119 through a port in one side thereof. In one or more embodiments, the step of charging may include introducing the rubber to the mixing extruder in melt form at the inlet end 113 pre-mixed with one or more of the filler, extender, or other constituents of the vulcanizable rubber composition. In other embodiments, the step of charging may include introducing the rubber to the mixing extruder in melt form downstream of the inlet end 113 from a side-feed pre-mixing extruder.

In one or more embodiments, the step of charging may include introducing a master batch of the vulcanizable rubber to the mixing extruder. The master batch may include the vulcanizable rubber in melt form, the filler, the extender and/or the other constituents of the vulcanizable rubber composition, excluding the curative. In these embodiments, the step of charging may include introducing the curative to the mixing extruder 110 at the feed throat 114, or the secondary feed throat 116, during mixing of the master batch within the mixing extruder.

The geometries of the spindles or screws of the mixing extruder and the rate of rotation of the spindles determine, at least in part, the speed at which the vulcanizable rubber composition travels through the mixing extruder 110. In or more embodiments, the rate of feed may also determine the output rate of the material through the extruder. In one or more embodiments, the rate of rotation of the spindles or screws within the mixing extruder 110 may be adjusted based upon the temperatures desired within the mixing extruder and/or based upon a desired residency time within the mixing extruder. Alteration of the rate of rotation of the spindles may affect the heat generated within the mixing extruder 110 during compounding because shear forces exerted by the spindles on the material generate heat, and a greater speed of rotation results in more shear forces acting on the material and, therefore, more heat.

In one or more embodiments, the temperature, mixing forces and/or residence time may vary with respect to the ingredient. Within certain embodiments, the temperature, mixing forces, and/or residence time within the extruder may be different for the curative than the other ingredients. For example, in one or more embodiments, the residence time of the curative within the mixing extruder may be less than that of the filler. This can be achieved by introducing the curative to the mixing extruder downstream of the other ingredients. In one or more embodiments, the residence time of the curative within the mixing extruder is less than 6 minutes, in other embodiments less than 5 minutes, in other embodiments less than 4 minutes, and in other embodiments less than 3 minutes.

In one or more embodiments, mixing of the vulcanizable rubber composition within the mixing extruder 110 may occur at or near the highest temperature possible without causing scorching of the vulcanizable rubber composition. As used herein, scorching refers to the premature curing of vulcanizing of the vulcanizable rubber composition to a degree that renders the composition unworkable in subsequent processing operations. Scorching is a function of both temperature and time. Exposure of the vulcanizable rubber composition to high temperatures for even a short time may result in scorching, and extended exposure to lower temperatures may also result in scorching.

In one or more embodiments, processing parameters within the mixing extruder may be adjusted to achieve the maximum temperature of the vulcanizable rubber composition at the output end 112 without causing scorching. In certain embodiments, where the curative is added downstream, the temperature $T_1$ of the rubber mixture before introduction of the curative may be higher than the temperature $T_2$ of the vulcanizable rubber composition after adding of the curative. A higher temperature $T_1$ prior to addition of the curative allows for more efficient mixing of the rubber and other ingredients, and a lower temperature $T_2$ may prevent scorching. It will be appreciated by those skilled in the art that the temperatures $T_1$ and $T_2$ may also be a function of the residency time of the rubber mixture and vulcanizable rubber composition within the mixing extruder.

In one or more embodiments, the temperature $T_1$ of the rubber mixture prior to addition of the curative is less than a decomposition temperature of the rubber. In certain embodiments, the temperature $T_1$ of the rubber mixture prior to introduction of the curative may be less than 350° C., in other embodiments less than 340° C., in other embodiments less than 330° C., in other embodiments less than 320° C., in still other embodiments less than 310° C., and in yet other embodiments less than 300° C.

In one or more embodiments, the maximum temperature $T_2$ of the vulcanizable rubber composition, after introduction of the curative, may be less than the scorching temperature, taking into account the residency time of the vulcanizable rubber composition within the mixing extruder 110. In certain embodiments, the maximum temperature $T_2$ of the vulcanizable rubber composition after introduction of the curative may be less than 200° C., in other embodiments less than 190° C., in still other embodiments less than 180° C., and in yet other embodiments less than 170° C. In a particular embodiment, the maximum temperature $T_2$ of the vulcanizable rubber composition, after introduction of the curative, may be approximately 140° C.

In one or more embodiments, the mixing extruder 110 may include heating and/or cooling mechanisms or fluids to maintain the temperature of the vulcanizable rubber composition being processed therein. In certain embodiments, the ability to maintain and control the temperature of the rubber mixture and/or vulcanizable composition within the mixing extruder 110 may be enhanced by employing a mixing extruder that provides a relatively high surface area per unit volume of the rubber mixture and/or vulcanizable rubber composition during mixing. In certain embodiments, the temperature of the vulcanizable rubber composition, at any point along the longitudinal axis of the mixing extruder 110, may be maintained within +/−5° C. of a desired or target temperature, in other embodiments the temperature may be maintained within +/−4° C. of a target temperature, in still other embodiments the temperature may be maintained within +/−3° C. of a target temperature, and in yet other embodiments the temperature may be maintained within +/−2° C. of a target temperature.

In certain embodiments, the temperature of the rubber mixture and/or vulcanizable rubber composition within the mixing extruder may be homogeneous. In these embodiments, the temperature of the vulcanizable rubber composition, at any point on a section plane through the mixing extruder 110, taken perpendicular to the longitudinal direction, may have a variation from other points on the same section plane of less than 5° C., in other embodiments a variation of less than 4° C., in still other embodiments a variation of less than 3° C., and in yet other embodiments a variation of less than 2° C.

Figure 3:
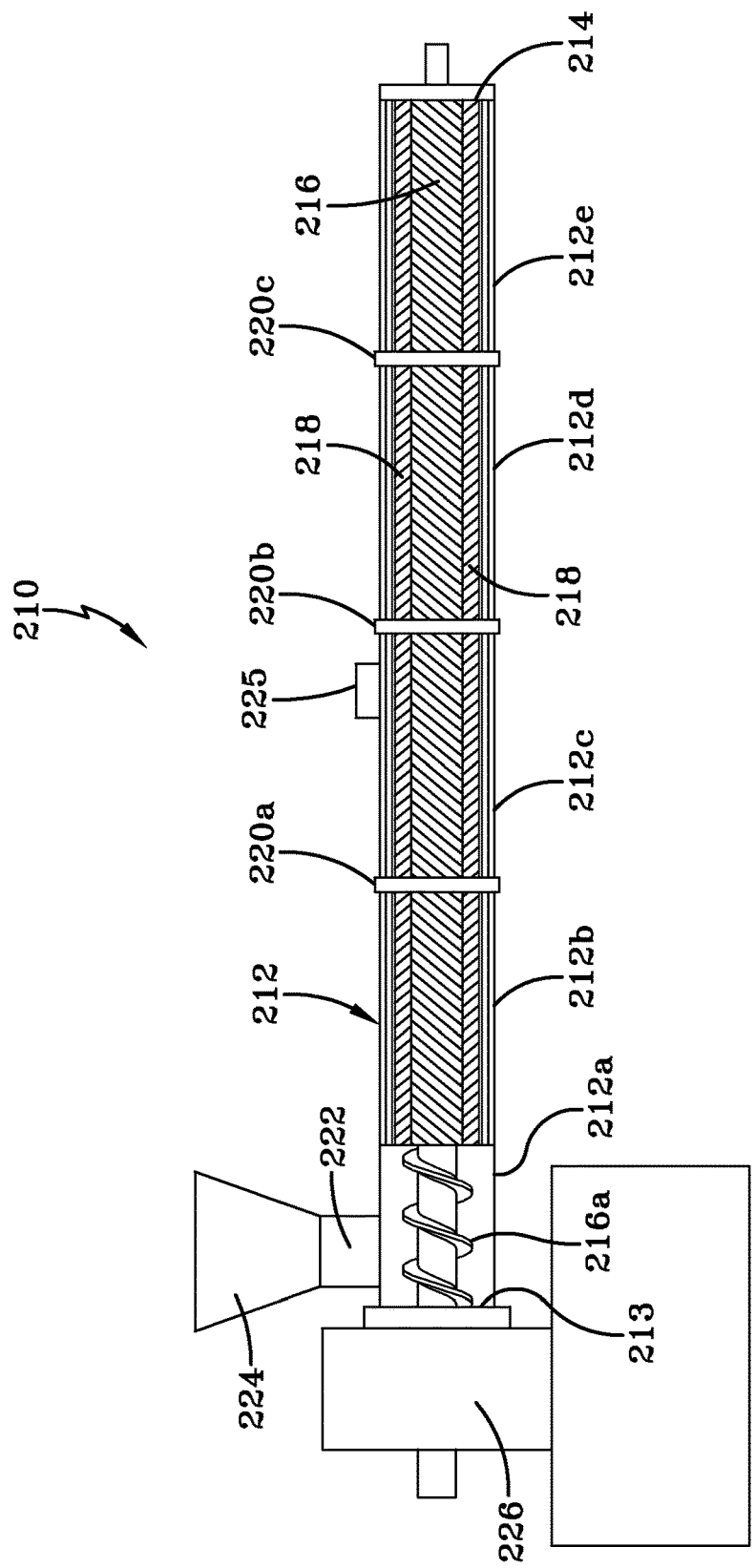
FIG. 3 is a longitudinal cross section view of a prior art planetary mixing extruder suitable for use in the system and method of the present invention.
Figure 4:
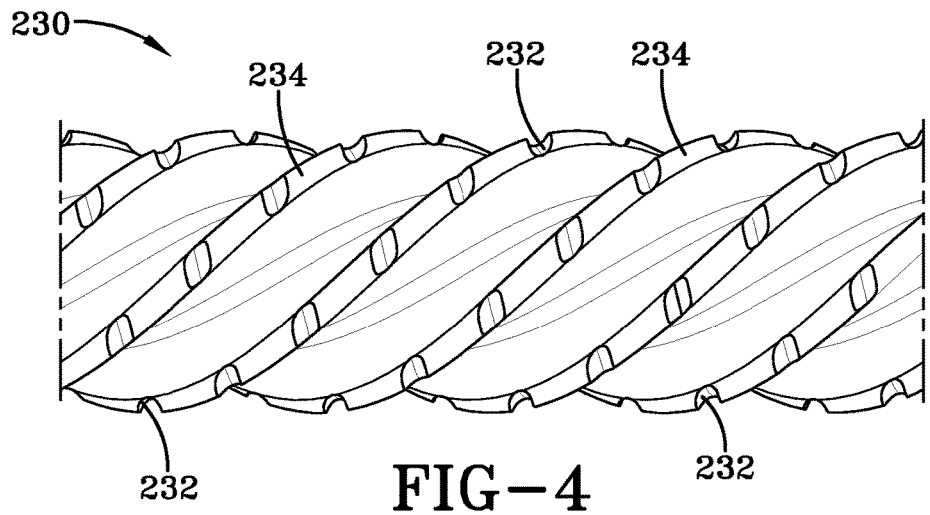
FIG. 4 is an enlarged view of an exemplary back-cut spindle that may optionally be employed in the planetary mixing extruder of FIG. 3.
Figure 5:
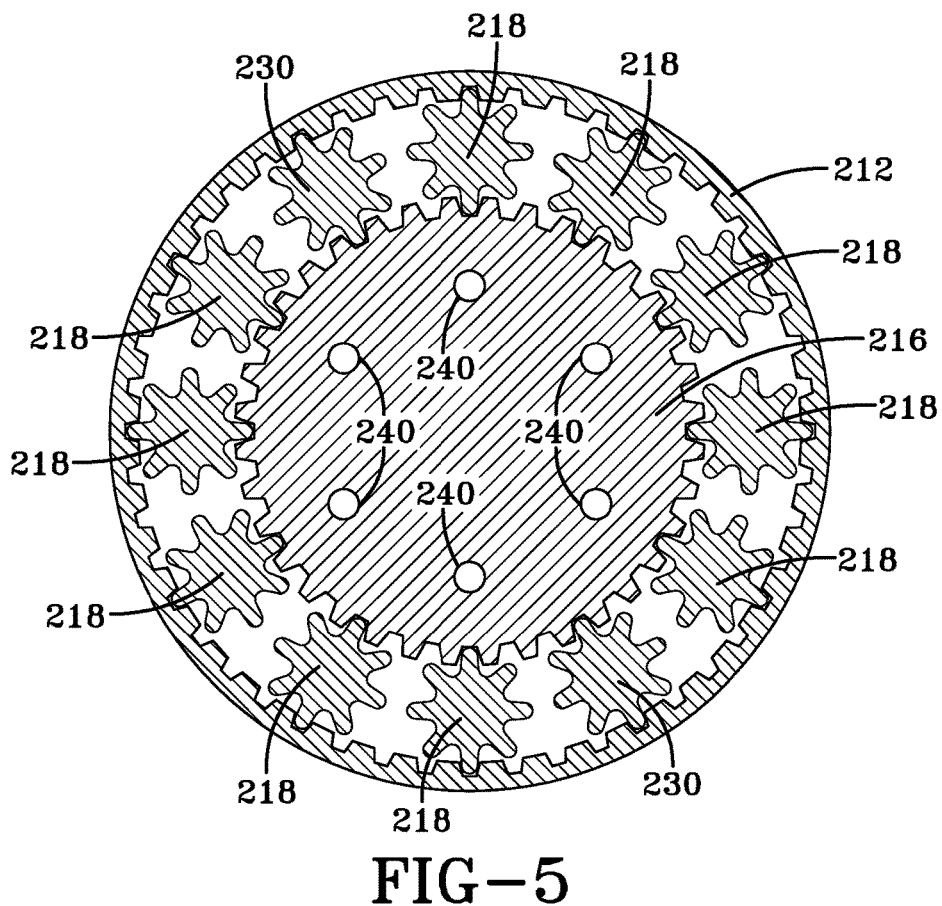
FIG. 5 is a sectional view of the planetary mixing extruder taken generally along line 5-5 of FIG. 3.

In an exemplary embodiment, and as previously indicated, the step of mixing the rubber and other ingredients may be performed using a planetary mixing extruder. Referring to FIGS. 3-5, a prior art planetary mixing extruder is shown to illustrate one or more aspects of the invention. While an exemplary planetary mixing extruder is shown and described, it is contemplated that any known planetary mixing extruder may be utilized, and the scope of the present invention should not be limited to the embodiment shown in FIGS. 3-5 and described herein. For example, other suitable planetary mixing extruders are disclosed in WO 2004/009327 A1 and U.S. 2005/0170086, which are incorporated herein by reference.

The planetary mixing extruder 210 includes a barrel 212 extending longitudinally from an inlet end 213 to an outlet end 214. For descriptive purposes, the term downstream will be used to refer to the direction of flow of the vulcanizable rubber composition within the planetary extruder. The vulcanizable rubber composition is conveyed from the inlet end 213 of the barrel 212 toward the outlet end 214. The term upstream refers to the direction toward the inlet end 213 and opposite the downstream direction.

In one or more embodiments, the planetary mixing extruder 210 includes a main spindle 216 positioned generally concentrically within the barrel 212. The planetary mixing extruder may also include a plurality of planetary spindles 218 that are positioned radially between the main spindle 216 and the barrel 212 and are spaced circumferentially around the main spindle 216.

In one or more embodiments, the barrel 212 may be divided into a plurality of sections including, for example, a filling section 212a, and one or more compounding sections 212b, 212c, 212d and 212e. In one or more embodiments, the compounding sections 212b, 212c, 212d and 212e may be separated by dosing rings 220a, 220b, and 220c. The dosing rings 220a, 220b and 220c may include radial bores to allow for the metered addition of components of the vulcanizable rubber composition or for the extraction of gasses.

In one or more embodiments, the filling section 212a is located at or adjacent to the inlet end 213, upstream of the compounding sections 212b-e of the planetary mixing extruder 210. Within the filling section 212a the main spindle 216 may be equipped with large grooves or flights 216a to facilitate the initial conveying and blending of a relatively large volume of material, as will be appreciated by those skilled in the art. The filling section 212a is devoid of planetary gears 218, as provided in the compounding sections 212b-e. Instead, the filling section 212a is in communication with a feed throat 222 to facilitate charging of the planetary mixing extruder 210 with one or more components of the vulcanizable rubber composition. In certain embodiments, a feed hopper 224 may be provided at feed throat 222. In one or more embodiments, one or more secondary feed throats 225 may be provided downstream of the feed throat 222 to allow charging of one or more of the compounding sections 212b-212e.

In one or more embodiments, a motor housing 226 containing a drive motor (not shown) may be provided adjacent to filling section 212a. The drive motor may be operatively connected to the main spindle 216 to cause rotation thereof. In certain embodiments, the drive motor may be adapted to create varying rotational speeds of the main spindle 216 to allow for adjustment of the rotational speed of the main spindle 216, and the planetary spindles 218 indirectly. The rotational drive speed of the drive motor may be adjusted through a user interface by an operator. In one or more embodiments, the user interface may be a computerized operating system, as is known in the art.

The planetary spindles 218 may have many different tooth geometries, such as, for example, full helical flights, double transversal helical flights (also referred to as back-cut spindles), and zoned helical flights. The types of tooth geometries available and their functions will be readily understood by those skilled in the art. The number of planetary spindles 218 chosen and their geometries may be manipulated to influence the flow of vulcanizable rubber composition through each barrel section 212b, 212c, 212d and 212e. Additionally, the annular gap between an inner circumference of the annular dosing rings 220a, 220b and 220c and the main spindle 216 may be changed to vary the flow rate of the material through each barrel section 212b-e and the discharging differential between the barrel sections.

In one or more embodiments, one or more planetary spindles 218 may be back-cut spindles (double transversal spindles), as shown in FIG. 3 and indicated generally by the numeral 230. These back-cut spindles 230 provide less pressure, more slippage, less forward motion, longer residence time, and greater mixing of the vulcanizable rubber composition. In certain embodiments, the back-cut spindles 230 may include openings 232 in the flights 234. The openings 232 permit material to pass between the back-cut spindle 230 and the wall of the barrel 212 and the main spindle 216, which slows the rate at which the vulcanizable rubber composition travels through the planetary mixing extruder 210. The number and depth of the openings 232 may also be varied.

It is also contemplated that the geometry of a single planetary spindle 218 may vary along its longitudinal length to have sections or zones that impart different forces upon the vulcanizable rubber composition. For example, a single planetary spindle 218 may include a longitudinal section or zone with full helical flights, and an adjacent downstream section or zone may include back-cut flights. As will be appreciated by those skilled in the art, a variety of flow patterns of the vulcanizable rubber composition within the planetary mixing extruder 210 may be achieved by providing varying geometries of the planetary spindles 218.

In one or more embodiments, the barrel 212 and/or main spindle 216 may be provided with channels 240 containing cooling or heating fluids (FIG. 5). It is also contemplated that the barrel 212 may be encased within a housing, and a heating/cooling fluid may be provided on an exterior of the barrel 212. The heating/cooling fluids may allow for more precise control of the temperature of the vulcanizable rubber composition within the planetary mixing extruder 210.

The planetary mixing extruder 210 creates relatively thin layers of the vulcanizable rubber composition within the compounding sections 212b-e, which results in a relatively large surface area of the material. This relatively large surface area of the material being processed, as compared to single screw or twin screw mixing extruders, improves the ability to control the temperature of the material during processing. The fluids within the channels 240 may be used to either heat or cool the vulcanizable rubber composition during processing to maintain the rubber mixture and/or vulcanizable rubber composition within a close range of a target temperature. Different configurations of channels 240 may be provided along the length of the planetary extruder to apply increasing, decreasing, or varying amounts of heating or cooling to the vulcanizable rubber composition as it is conveyed downstream toward the outlet end 214.

Continuous Forming

In one or more embodiments, the vulcanizable rubber composition may be continuously extruded to form a vulcanizable rubber extrudate following the step of continuously mixing in the mixing extruder 110. Extruding, as used herein and as understood by those skilled in the art, refers to the act of forcing the vulcanizable rubber composition through an extrusion die 122 having an opening with a desired cross-section to create an extrudate of the vulcanizable rubber composition. The vulcanizable rubber extrudate produced by the extrusion process has the same general cross-sectional shape as the opening of the extrusion die.

In one or more embodiments, the pressure of the vulcanizable rubber composition may be increased prior to the step of extruding in order to provide the force necessary to propel the material through the extrusion die 122. In one or more embodiments, a section or zone of the mixing extruder 110 adjacent to the outlet end 112 acts to increase the pressure of the vulcanizable rubber composition, and the step of continuously extruding may occur immediately after the vulcanizable rubber composition exits the mixing extruder 110. In other embodiments, the vulcanizable rubber composition may be fed from the outlet end 112 of the mixing extruder 110 into a melt pump, a twin screw extruder, or a single screw extruder 120 (as shown in FIG. 1), collectively referred to hereinafter as pump 120. The pump 120 acts to increase or maintain the pressure of the vulcanizable rubber composition as it is conveyed from the mixing extruder 110 to the extrusion die 122. In certain embodiments, a vacuum 121 may communicate with an internal chamber of the pump 120, either in conjunction with or in lieu of the vacuum 118 of the mixing extruder 110.

In one or more embodiments, the residency time of the vulcanizable rubber composition within the mixing extruder, from the first introduction of some or all of the ingredients at the inlet end of the mixing extruder 110 to extrusion of the vulcanizable rubber composition, may be less than 8 minutes, in other embodiments less than 7 minutes, in other embodiments less than 6 minutes, in other embodiments less than 5.5 minutes and in yet other embodiments less than 5 minutes.

In one or more embodiments, the temperature of the vulcanizable rubber composition at the extrusion die 122 may be between approximately 120 and 160° C., in other embodiments between approximately 125 and 155° C., in still other embodiments between approximately 130 and 150° C., and in yet other embodiments between approximately 135 and 145° C. In a particular embodiment, the temperature of the vulcanizable rubber composition at the extrusion die 122 may be approximately 140° C.

In one or more embodiments, the vulcanizable rubber extrudate, immediately following extrusion, may have a thickness of between approximately 60 to 130 mils, in other embodiments between approximately 70 to 110 mils, in still other embodiments between approximately 80 to 100 mils, and in yet other embodiments between approximately 85 and 95 mils. In the same or other embodiments, the vulcanizable rubber extrudate, immediately following extrusion, may have a thickness of greater than 60 mills, in other embodiments greater than 70 mils, in still other embodiments greater than 80 mills, and in yet other embodiments greater than 90 mils.

In certain embodiments, the vulcanizable rubber extrudate may have a degree of cure immediately following extrusion of less than 25%, in other embodiments less than 20%, in still other embodiments less than 15%, and in yet other embodiments less than 10%. As will be understood by those skilled in the art, the terms cure and cured, as used herein, are a matter of degree, and the degree of cure refers to the amount of rubber that is insoluble in cyclohexane under standard conditions.

In one or more embodiments, the vulcanizable rubber extrudate may be continuously calendered to form a green membrane. Calendering refers to the application of a compressive force or pressure to the extrudate to create a flat, uniform, smooth sheet. The green membrane may have a degree of cure, at the time of calendering, substantially similar to the degree of cure of the vulcanizable rubber extrudate at the time of extrusion. In one or more embodiments, the green membrane may have a degree of cure of less than 25%, in other embodiments less than 20%, in still other embodiments less than 15%, and in yet other embodiments less than 10%.

In one or more embodiments, the step of continuously calendering may be performed with a pair of calender rollers spaced from one another to form a gap through which the material travels. In other embodiments, the step of continuously calendering may be performed by a single calender roller spaced from a stationary member to form a gap through which the material travels. The application of pressure by the calender rollers results in creation of a smooth sheet having a thickness equal to the width of the gap. The step of calendering and the compressive forces acting upon the extrudate may also result in a reduction of the thickness of the green membrane 125 as compared to the extrudate and in the elimination of any voids within the extrudate.

In one or more embodiments, the time from introduction of the curative to the rubber mixture and the step of calendering may be less than 8 minutes, in other embodiments less than 7 minutes, in other embodiments less than 6 minutes, in other embodiments less than 5 minutes, and in still other embodiments less than 4 minutes.

In one or more embodiments, the green membrane 125, following calendering, may have a thickness of between approximately 20 and 100 mils, in other embodiments between approximately 35 and 90 mils, in still other embodiments between approximately 45 and 80 mils, and in yet other embodiments between approximately 50 and 75 mils. In the same or other embodiments, the green membrane 125, after calendering, may have a thickness of less than 90 mils, in other embodiments less than 85 mils, in other embodiments less than 80 mils, in still other embodiments less than 75 mils, and in yet other embodiments less than 70 mils.

In one or more embodiments, the extrusion die 122 may be a roller head die, which may include one or a pair of calender rollers immediately adjacent to the die opening. The extruded rubber composition immediately passes through the calender rollers after extrusion and is compressed into a green membrane 125 for further processing. Thus, the roller head die performs both the steps of continuously extruding and continuously calendering. U.S. Pat. No. 4,372,736 discloses a suitable roller head die in greater detail, and is incorporated herein by reference in its entirety.

While a particular extrusion die 122 is described herein, it is contemplated that any extrusion die known to those skilled in the art and suitable for the intended application may be employed.

In one or more embodiments, the vulcanizable rubber extrudate may pass through a series of calender rollers 124, each applying compressive forces to further compress and reduce the thickness of the vulcanizable rubber extrudate. In certain embodiments, the vulcanizable rubber extrudate may pass through two or more pairs of calender rollers. In one or more embodiments, one or more of the calender rollers 124 may be heated or cooled to ensure that the green membrane 125 is at the optimum temperature during and after calendering. In certain embodiments, the calender rollers 124 may be heated to maintain the green membrane 125 at an elevated temperature, thereby facilitating efficient curing.

In one or more embodiments, the distance between the extrusion die and the calender rollers, and therefore the distance that the vulcanizable rubber extrudate travels between being extruded and being calendered, may be relatively short. In certain embodiments, the distance between the extrusion die 122 and the first set of calender rollers 124 may be less than 24 inches, in other embodiments less than 18 inches, in still other embodiments less than 12 inches, and in yet other embodiments less than 6 inches.

In one or more embodiments, the amount of time that elapses between the step of extruding the vulcanizable rubber composition and the step of calendering the vulcanizable rubber extrudate is less than 20 seconds, in other embodiments less than 15 seconds, in still other embodiments less than 12 seconds, and in yet other embodiments less than 10 seconds.

Continuous Curing

Following the step of calendering the vulcanizable rubber extrudate to produce the green membrane 125, one or more guide rollers (not shown) may be provided to guide the green membrane 125 to a continuous curing station 128. The continuous curing station 128 is adapted to apply energy to the green membrane 125 to cause or accelerate curing of the vulcanizable rubber composition and produce a cured membrane 126 that exits the continuous curing station 128. In certain embodiments, the cured membrane 126 is substantially cured as it exits the curing station 128. Any known method of applying energy to the green membrane 125 for continuous curing may be employed in the continuous curing station 128, such as, for example, use of rotary curing equipment, applying IR radiation to the green membrane, applying an electron-beam to the green membrane, applying ultraviolet radiation to the green membrane, and forcing hot air across the green membrane.

In one or more embodiments, continuous curing station 128 may include a rotary curing device (not shown) that subjects the green membrane 125 to increased temperatures and pressures as it travels around a rotating drum. The green membrane 125 is routed around a series of drums or rollers, one or more of which may be heated. Pressure and/or tension is also applied to the green membrane as it travels through the rotary curing device to accelerate curing, and to remove voids within the membrane created by air or gas generated during the mixing step. U.S. Pat. No. 6,093,354 discloses a rotary curing process in greater detail, and is incorporated herein by reference in its entirety.

In one or more embodiments, and as shown in FIG. 6, the curing station 128 may include a series of rollers 130 creating a zig-zag or back-and-forth pattern of the green membrane 125 to form a hot air conveyor curing system. Air is forced over or through a heating implement 131 and then across the green membrane 125 as it travels around the rollers 130. In certain embodiments, the air flow may be generated by one or more fans 132. The hot air flowing across the green membrane 125 causes or accelerates curing of the membrane.

In one or more embodiments, the hot air acts to raise the temperature of the green membrane 125. In other embodiments, the hot air merely maintains the temperature of the green membrane 125 to prevent it from cooling. As will be appreciated by those skilled in the art, the zig-zag pattern allows the green membrane 125 to remain within the hot air curing environment for an extended period of time without necessitating a significant slowing of the conveyor speed or a curing conveyor having an impractical length. Notably, the green membrane 125 is not subjected to any significant increase in pressure or tension as it passes through the hot air conveyor curing system.

It has been discovered that a high quality cured membrane can be produced from a process including the steps of continuously mixing the vulcanizable rubber composition in a mixing extruder, continuously applying a suction force to a portion of the internal mixing chamber of the mixing extruder to remove gasses, and continuously curing the green membrane in a curing environment devoid of elevated pressures. The continuous mixing performed by the planetary mixing extruder and the continuous application of suction forces results in a vulcanizable rubber extrudate having no voids or pockets of air or gasses. Therefore, elevated pressures are not necessary in the continuous curing step to remove voids within the green membrane, which may render hot air conveyor curing a viable continuous curing option.

In one or more embodiments, the cured membrane 126 may have a degree of cure of greater than 80%, in other embodiments greater than 85%, in still other embodiments greater than 90%, and in yet other embodiments greater than 95%. In one or more embodiments, the cured membrane 126 produced by the disclosed system and method meets the performance standards of ASTM D4637.

Additional Processing

Following the step of continuously curing the green membrane 125, the cured membrane 126 may be subjected to one or more additional processing steps prior to storage and/or shipping. In one or more embodiments, the cured membrane 126 may be cut to length to form roofing membranes for installation at a roofing installation site. In the same or other embodiments, the cut membranes may be rolled for storage and shipping. In certain embodiments, the cured membrane 126 may be spliced with other cured membranes to form a larger membrane.

In one or more embodiments, a thin film such as, for example, a primer and/or adhesive, may be applied to one or more surfaces and/or longitudinal edges of the cured membrane 126 prior to the steps of cutting and/or rolling. For example, in certain embodiments a thin film of adhesive may be applied to substantially all of one surface of the membrane for a fully adhered roofing system, as will be understood by those skilled in the art. In other embodiments, a thin film of primer and/or adhesive may applied in a narrow strip along one or more longitudinal edges of the membrane to facilitate the creation of lap seams. A release liner may optionally be positioned over the primer or adhesive layer.

In one or more embodiments, the process of the present invention may also include the step of creating a pattern on one or both faces of the membrane. In the same or other embodiments, the process of the present invention may include the step of attaching a fibrous sheet, such as, for example, a fleece sheet, to one surface of the membrane. In certain embodiments, the process of the present invention may include the step of applying an acrylic coating to one or both surfaces of the membrane.

Notably, a cured membrane formed by the methods of the present invention does not require rolling prior to curing. Therefore, it may not be necessary to apply an anti-sticking agent to the green membrane (such as, for example, talc or mica) prior to curing. This may also alleviate the requirement of cleaning the cured membrane during creation of a lap seam as part of the installation process. Thus, cured membranes produced according to the present invention may also result in improved installation techniques.

In one or more embodiments, the cured membrane created by the practice of the present invention includes a cured sheet of ethylene-propylene-diene copolymer rubber (EPDM). Dispersed within the crosslinked network of ethylene-propylene-diene copolymer may be various additives including, but not limited to, filler, oil, wax, antioxidant, antiozonant, flame retardant, and the like. In one or more embodiments, the cured membrane may be a single-ply sheet or a multi-ply sheet. In certain embodiments, the cured membrane may be devoid of fabric reinforcement or it may include a fabric reinforcement positioned between two or more plies. In one or more embodiments, the cured membrane may conform to the standards set forth in ASTM-D4637 (Standard Specification for EPDM Sheet Used In Single-Ply Roof Membrane).

In one or more embodiments, the total processing time of the manufacturing process discussed herein, including mixing, extruding, calendering, and curing, may be significantly reduced as compared to prior art manufacturing methods. In certain embodiments, the total processing time of the manufacturing process may be less than 2.0 hours, in other embodiments less than 1.5 hours, in other embodiments less than 1.0 hours, and in yet other embodiments less than 0.5 hours. As will be appreciated by those skilled in the art, this process offers a significant time savings over prior art manufacturing methods including batch processes, which may have a total processing time of as much as 10 hours, in certain embodiments as much as 12 hours, and in some embodiments in excess of 15 hours.

It will also be appreciated by those skilled in the art that the system utilized to practice the manufacturing method of the present invention may allow for a significant reduction in the available space required in a manufacturing facility. Notably, a curing oven (e.g. autoclave) is not required in the method of the present invention. Despite the time and space savings offered by the disclosed system and method, the resulting rubber membrane is of the same or higher quality than those produced by prior art methods. Particularly, the membrane surface quality of cured rubber membranes produced by the disclosed method may be improved as compared to rubber membranes produced using prior art methods.

In addition, a cured membrane formed by the methods of the present invention does not require rolling prior to curing. Therefore, it may not be necessary to apply an anti-sticking agent to the green membrane (such as, for example, talc or mica) prior to curing. This may also alleviate the requirement of cleaning the cured membrane during creation of a lap seam as part of the installation process. Thus, cured membranes produced according to the present invention may also result in improved installation techniques.

Various modifications and alterations that do not depart from the scope and spirit of this invention will become apparent to those skilled in the art. This invention is not to be unduly limited to the illustrative embodiments set forth herein.

What is claimed is:

1. A method of continuously manufacturing a cured membrane, the method comprising:
   mixing EPDM rubber, filler, oil and curative within a mixing extruder to form a vulcanizable rubber composition;
   subjecting the vulcanizable rubber composition to a reduced pressure by applying a vacuum to form a vulcanizable rubber composition with reduced levels of entrapped gases;
   extruding the vulcanizable rubber composition with reduced levels of entrapped gases to form a continuous partially-cured extrudate, where said step of extruding takes place at a temperature between 120 and 160° C.;
   calendaring the partially-cured extrudate to form a partially-cured membrane; and
   curing the partially-cured membrane to form a substantially cured membrane, where said step of curing is devoid of elevated pressures.

2. The method of claim 1, wherein the step of mixing includes conveying the vulcanizable rubber composition downstream toward an outlet end of the mixing extruder.

3. The method of claim 1, wherein the step of mixing includes back-mixing the vulcanizable rubber composition in a portion of the mixing extruder.

4. The method of claim 1, wherein the step of mixing includes maintaining a temperature of the vulcanizable rubber composition at any point along a length of the mixing extruder within +/−5° C. of a desired temperature.

5. The method of claim 1, wherein the step of mixing includes maintaining a temperature of the vulcanizable rubber composition at all points on a section plane through the mixing extruder within a temperature variance of +/−5° C.

6. The method of claim 1, where the rubber is added to the mixing extruder at a feed throat, and where the curative is added to the mixing extruder downstream of the feed throat.

7. The method of claim 1, wherein the step of curing includes forcing hot air across the partially-cured membrane.

8. The method of claim 1, wherein the step of curing includes applying heat and pressure to the partially-cured membrane.

9. The method of claim 1, wherein the step of curing includes applying an electronic beam to the partially-cured membrane.

10. A continuous method of manufacturing a cured membrane comprising:
    charging rubber, filler, oil, and a curative to a mixing extruder; mixing the rubber, filler, oil and curative to form a vulcanizable rubber composition;
    subjecting the vulcanizable rubber composition to a reduced pressure by applying a vacuum within the mixing extruder to form a vulcanizable rubber composition with reduced levels of entrapped gases;
    extruding the vulcanizable rubber composition with reduced levels of entrapped gases to form a continuous partially-cured extrudate, where said step of extruding takes place at a temperature between 120 and 160° C.;
    applying a compressive force to the partially-cured extrudate to form a partially-cured membrane; and
    applying energy to the partially-cured membrane to form a substantially cured membrane, where a total processing time of the method after charging, including the steps of mixing, subjecting the composition to a reduced pressure, extruding, applying a compressive force, and applying energy to the partially-cured membrane is less than 2.0 hours, and where the time from said step of charging rubber, filler, oil, and curative to a mixing extruder to said step of applying compressive force to the partially-cured extrudate is less than 8 minutes.

11. The method of claim 10, where the total processing time from the step of charging the curative through the step of extruding the vulcanizable rubber composition is less than 7 minutes.

12. The method of claim 10, where the total processing time from the step of charging the curative through the step of applying a compressive force to the extrudate is less than 7 minutes.

13. The method of claim 10, where a total elapsed time between the steps of extruding the vulcanizable rubber composition and applying a compressive force to the extrudate is less than 20 seconds.

14. The method of claim 10, wherein residence time of the curative within the mixing extruder is less than 6 minutes.

15. The method of claim 10, where the vulcanizable rubber composition is between approximately 120 and 160° C. at the time of extruding.

16. The method of claim 10, where the vulcanizable rubber composition is between approximately 130 and 150° C. at the time of extruding.

17. The method of claim 10, where the vulcanizable rubber composition is between approximately 135 and 145° C. at the time of extruding.

* * * * *